(12) United States Patent  
Kutsch et al.

(10) Patent No.: US 6,587,354 B1
(45) Date of Patent: Jul. 1, 2003

(54) TELECOMMUNICATION ASSEMBLY (76) Inventors: Duane B. Kutsch, 13530 Linden Ave. N., #500, Seattle, WA (US) 98133; Loren M. Borg, 32408 16th Ave. SW., Federal Way, WA (US) 98023; Merril R. Gordon, 11521 SE. 80th St., Newcastle, WA (US) 98056; Gary M. Peterson, 33510 - 35th Ave. SW., Federal Way, WA (US) 98023; Charles William "Bill" White, 720 Anderson Rd., Moscow, TN (US) 38057

( * ) Notice: Subject to any disclaimer, the term of this patent is extended or adjusted under 35 U.S.C. 154(b) by 0 days.

(21) Appl. No.: 09/282,344

(22) Filed: Mar. 31, 1999

Related U.S. Application Data

(60) Provisional application No. 60/100,845, filed on Sep. 18, 1998.

(51) Int. Cl.$^7$ .............................................. H01R 12/16
(52) U.S. Cl. ...................... 361/788; 361/796; 361/798; 439/668
(58) Field of Search ................................. 361/727–730, 361/754, 756, 759, 788, 796, 798, 799, 800–802; 439/668, 64, 377

(56) References Cited

U.S. PATENT DOCUMENTS

| 4,002,399 A | 1/1977 | Deitch et al. ............... 339/221 |
| 4,017,770 A | 4/1977 | Valfre ............................ 361/399 |
| 4,213,013 A | 7/1980 | Perna et al. .................... 179/98 |
| 4,221,445 A | 9/1980 | Fleischhacker et al. ... 339/18 R |
| 4,273,966 A | 6/1981 | Briggs, Jr. et al. ............ 179/98 |
| 4,286,121 A | 8/1981 | Olszewski et al. ............ 179/98 |
| 4,312,552 A | 1/1982 | Hughes et al. ................ 339/36 |
| 4,423,466 A | 12/1983 | Beaun ......................... 361/400 |
| 4,426,558 A | 1/1984 | Takana et al. ............. 200/51.09 |
| 4,514,030 A | 4/1985 | Triner et al. ................ 339/176 |
| 4,595,799 A | 6/1986 | Krob et al. .................... 179/98 |
| 4,609,242 A | 9/1986 | Kemppainen ................ 339/17 |
| 4,618,194 A | 10/1986 | Kwilos ....................... 339/14 R |
| 4,628,159 A | 12/1986 | Deitch et al. ............. 200/51.05 |
| 4,705,921 A | 11/1987 | Rabey et al. ................. 200/50 |
| 4,737,985 A | 4/1988 | DeLuca et al. ............. 379/327 |
| 4,749,968 A | 6/1988 | Burroughs .................. 333/105 |
| 4,768,961 A | * 9/1988 | Lau .............................. 439/61 |
| 4,770,639 A | 9/1988 | Lau .............................. 439/61 |
| 4,773,867 A | 9/1988 | Keller et al. ................. 439/49 |
| 4,796,289 A | 1/1989 | Masor ......................... 379/26 |
| 4,797,114 A | 1/1989 | Lau .............................. 439/79 |
| 4,800,462 A | * 1/1989 | Zacher et al. ............... 361/413 |
| 4,811,169 A | 3/1989 | DeLuca et al. ............. 361/429 |
| 4,815,104 A | 3/1989 | Williams et al. ............. 375/36 |
| 4,820,200 A | 4/1989 | Lau ............................ 439/607 |

(List continued on next page.)

FOREIGN PATENT DOCUMENTS

| EP | 0 364 658 | 4/1988 | ...................... 1/14 |
| EP | 0 243 296 | 12/1990 | ...................... 1/14 |
| GB | 2 111 770 A | 7/1983 | ................... 13/703 |
| SU | 1582238 | 7/1990 | .................... 13/70 |

*Primary Examiner*—Albert W. Paladini
*Assistant Examiner*—Tuan Dinh
(74) *Attorney, Agent, or Firm*—Wells St. John P.S.

(57) ABSTRACT

A telecommunication assembly having a plurality of slots for receiving a plurality of modules therein. The telecommunication assembly couples to a telecommunication network and includes a plurality of distinct backplane circuit boards secured therein for each coupling to one of the plurality of modules. Each of the plurality of distinct backplane circuit boards includes a bounding edge, a back side partially encompassed by the bounding edge, a plurality of first connectors coupled to the back side for receiving a telecommunication signal from the telecommunication network, a front side coupled to the back side, and a second connector mounted on the front side and spaced apart from the at least one jack for coupling to one of the plurality of modules. The telecommunication assembly is operable with one or more of the plurality of distinct backplane circuit boards removed from the assembly.

25 Claims, 9 Drawing Sheets

U.S. PATENT DOCUMENTS

| | | | | |
|---|---|---|---|---|
| 4,821,146 A | * | 4/1989 | Behrens et al. | 361/383 |
| 4,861,281 A | | 8/1989 | Warner | 439/540 |
| 4,874,317 A | | 10/1989 | Lau | 439/54 |
| 4,941,165 A | | 7/1990 | Rademacher et al. | 379/1 |
| 4,975,087 A | | 12/1990 | Williams et al. | 439/668 |
| 5,078,624 A | | 1/1992 | Burroughs et al. | 439/668 |
| 5,178,554 A | | 1/1993 | Siemon et al. | 439/188 |
| 5,178,558 A | | 1/1993 | Knox et al. | 439/404 |
| 5,209,678 A | | 5/1993 | Allen et al. | 439/672 |
| 5,214,673 A | | 5/1993 | Morgenstern et al. | 375/36 |
| 5,233,501 A | | 8/1993 | Allen et al. | 361/733 |
| 5,265,156 A | | 11/1993 | Eason et al. | 379/327 |
| 5,272,277 A | | 12/1993 | Humbles et al. | 174/48 |
| 5,281,163 A | | 1/1994 | Knox et al. | 439/404 |
| 5,315,488 A | * | 5/1994 | Le Gallo et al. | 361/796 |
| 5,393,249 A | | 2/1995 | Morgenstern et al. | 439/668 |
| 5,432,847 A | | 7/1995 | Hill et al. | 379/328 |
| 5,439,395 A | | 8/1995 | Laukzemis | 439/668 |
| 5,456,608 A | | 10/1995 | Rogers et al. | 439/48 |
| 5,467,062 A | | 11/1995 | Burroughs | 333/124 |
| 5,482,469 A | | 1/1996 | Seiceanu et al. | 439/188 |
| 5,536,981 A | * | 7/1996 | Sato et al. | 307/116 |
| 5,546,282 A | | 8/1996 | Hill et al. | 361/796 |
| 5,552,962 A | | 9/1996 | Feustel et al. | 361/733 |
| 5,588,869 A | | 12/1996 | Jensen et al. | 439/417 |
| 5,639,261 A | | 6/1997 | Rutkowski et al. | 439/534 |
| 5,669,779 A | | 9/1997 | Galloway et al. | 439/188 |
| 5,685,741 A | | 11/1997 | Dewey et al. | 439/668 |
| 5,701,380 A | | 12/1997 | Larson et al. | 385/134 |
| 5,734,306 A | | 3/1998 | Jantunen et al. | 333/206 |
| 5,879,197 A | | 3/1999 | Dewey | 439/668 |
| 5,903,829 A | | 5/1999 | Anderson et al. | 455/347 |
| 5,909,155 A | | 6/1999 | Anderson et al. | 333/100 |
| 5,913,701 A | | 6/1999 | Olson et al. | 439/668 |

* cited by examiner

TELECOMMUNICATION ASSEMBLY

RELATED REFERENCES

This utility application is based on co-pending provisional patent application no. 60/100,845, which was filed Sep. 18, 1998, and entitled: "Digital Signal Cross Connect Panel Assembly and System."

FIELD OF THE INVENTION

In general, the present invention relates to assemblies, and, in particular, the present invention relates to a telecommunication assembly, associated DSX module, and backplane circuit boards therefor.

BACKGROUND

A digital signal cross connect (DSX) module is a passive telecommunication module that is disposed between, and couples together two active sections of telecommunication network equipment. DSX modules function as test access points allowing users to monitor or reroute telecommunication signals running through the network equipment. Only occasionally does the need arise to test or reroute these signals.

Current telecommunication assemblies include a PCB backplane with permanently mounted connectors on the back, which serves as a back wall for each assembly, and removable jack modules that connect to the backplane. A major disadvantage with these assemblies is that if one circuit on the PCB backplane becomes inoperable, the entire PCB backplane must be removed and replaced. This replacement makes the entire assembly inoperable for a given amount of time. Moreover, it is very costly to replace the entire backplane when only one of its hundreds of circuits goes "bad". In addition, many assemblies cannot function without every jack module installed in the assembly because the single backplane is not closed circuited. Further, the singular PCB backplane prevents jacks mounted thereon from easily coupling to the network equipment because they do not protrude outward in stair-step fashion without costly modifications to the connectors themselves.

In addition, the assemblies do not have DSX module guides, which also act as structural supports, thereby resulting in fragile assemblies. Self-closing doors are also not provided in current DSX assemblies to protect the interior of the assemblies when a particular DSX module is absent from a slot. Current designs have a removable plate that screws or snaps into position when the DSX module is removed. This is very cumbersome and time consuming to operate.

SUMMARY

A telecommunication assembly is provided that has a plurality of slots for receiving a plurality of modules therein. The telecommunication assembly couples to a telecommunication network and includes a plurality of distinct backplane circuit boards secured therein for each coupling to one of the plurality of modules.

Each of the plurality of distinct backplane circuit boards include a bounding edge and a back side partially encompassed by the bounding edge. A plurality of first connectors are coupled to the back side for receiving a telecommunication signal from the telecommunication network, a front side is coupled to the back side, and a second connector is mounted on the front side and spaced apart from the at least one jack for coupling to one of the plurality of modules.

The telecommunication assembly is operable with one or more of the plurality of distinct backplane circuit boards removed from the assembly. What's more, the back side of each of the plurality of distinct backplane circuit boards is stepped, staggering at least one of the plurality of first connectors for easy access. The plurality of first connectors are coupled to the back side and are mounted to the bounding edge of the each of the plurality of distinct backplane circuit boards.

A pair of guide ridges are attached to the telecommunication assembly for guiding the plurality of distinct backplane circuit boards when installed in, and removed from, the telecommunication assembly. At least one notch is formed in the bounding edge of each of the plurality of distinct backplane circuit boards. A plurality of tines are coupled to the telecommunication assembly with at least one of the plurality of tines partially extending into one of the notches on the backplane circuit boards.

A plurality of stops are disposed on the telecommunication assembly against which the bounding edge of each of the plurality of distinct backplane circuit boards abuts. A plurality of guide walls are disposed in the assembly for defining the plurality of slots, serving to guide each of the plurality of modules into the telecommunication assembly, and providing structural support to the telecommunication assembly.

At least one projection or strip is disposed on each of the guide walls for aiding in guiding each of the plurality of modules into the telecommunication assembly. Each of the modules includes a flange mounted thereon for gripping by an operator. An aperture is disposed in the assembly for receiving a tab mounted on one of the modules upon insertion of each of the plurality of modules into one of the plurality of slots. Moreover, each of the plurality of distinct backplane circuit boards are secured in parallel with one of the plurality of modules when inserted into one of the slots.

DETAILED DESCRIPTION OF THE PREFERRED EMBODIMENT(S)

Figure 1:
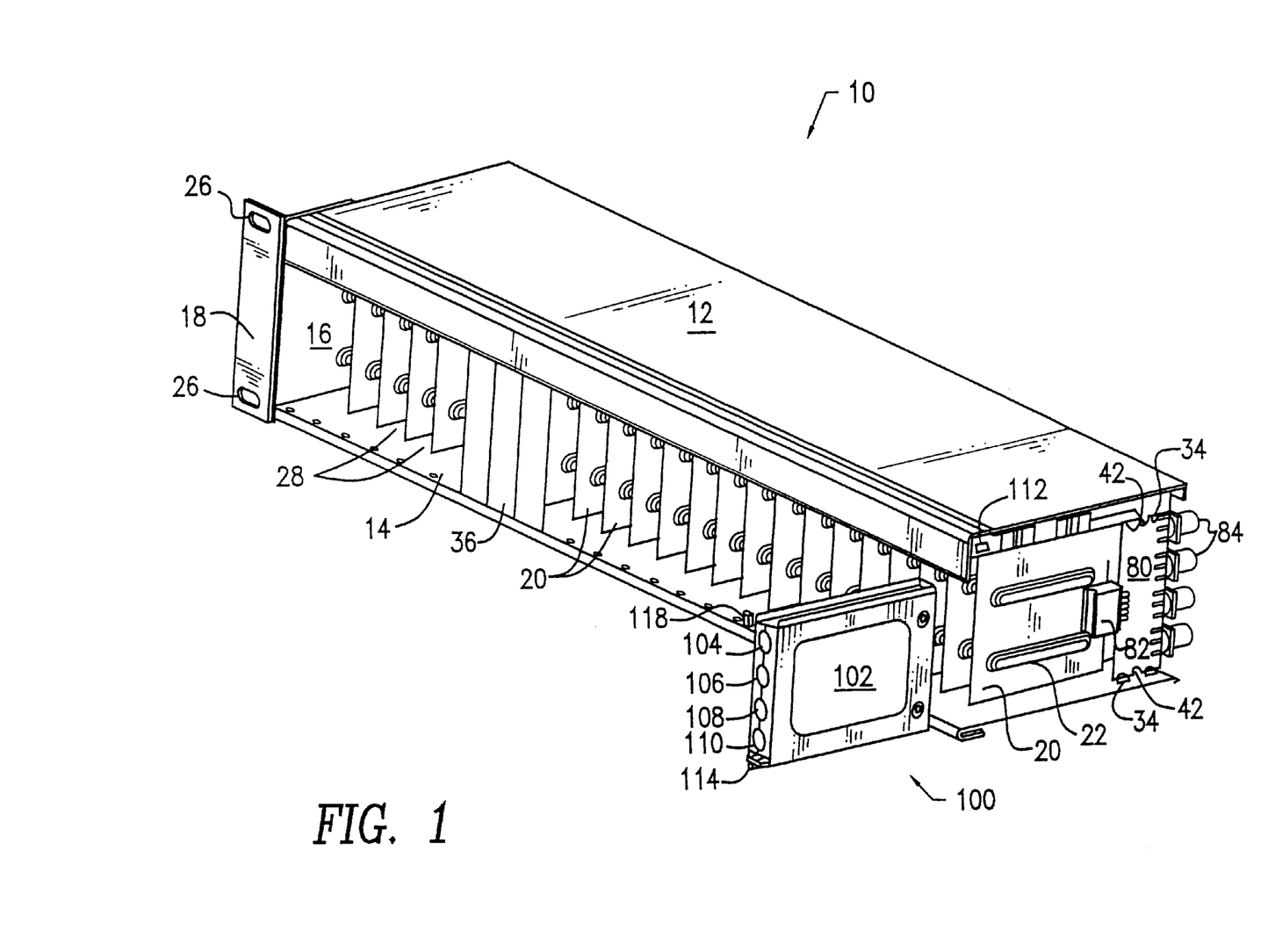
FIG. 1 is a front perspective view of a digital cross connect assembly, a module, and a backplane circuit board therefor of the present invention.
Figure 2:
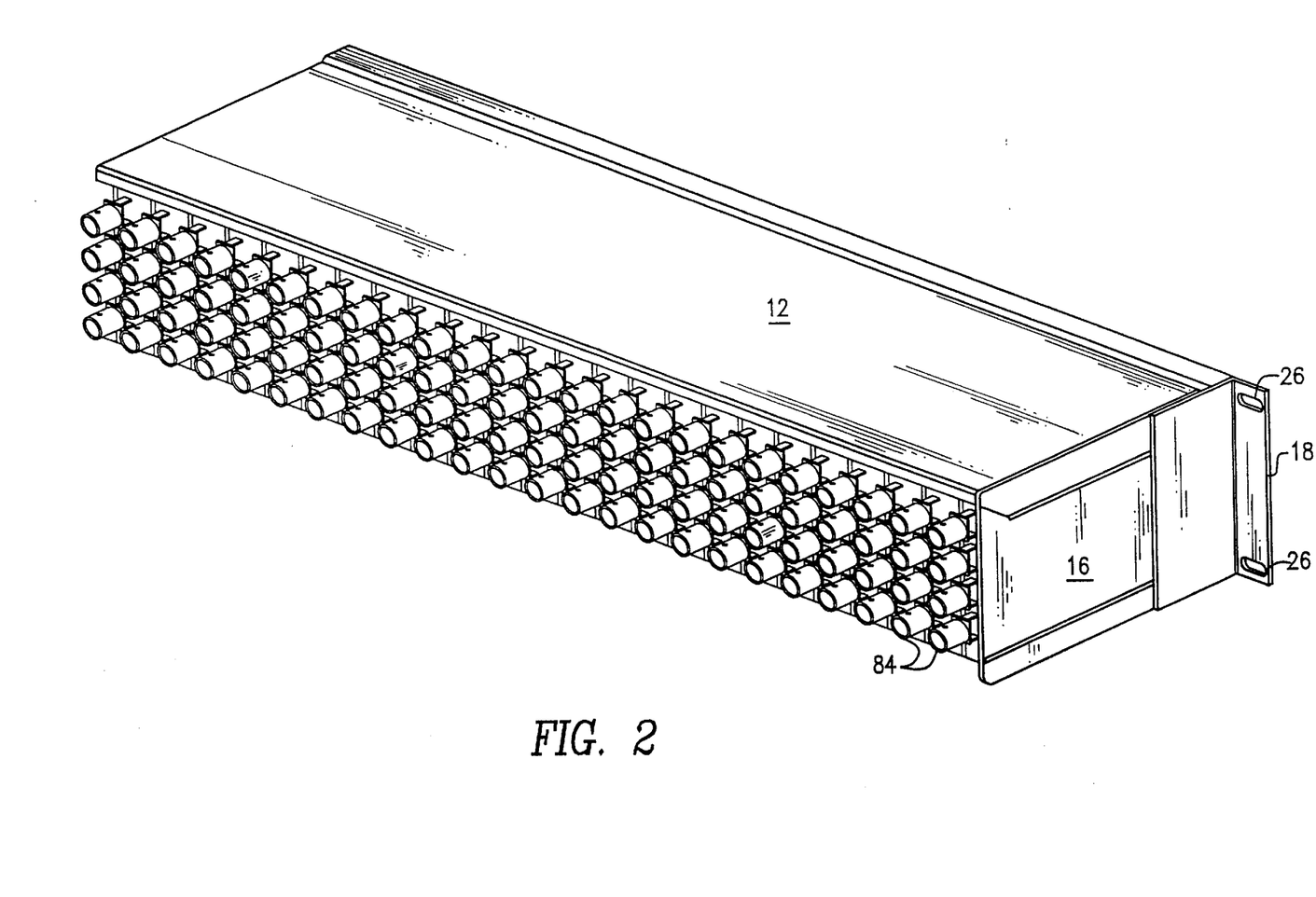
FIG. 2 is a rear perspective view of a digital cross connect assembly, a module, and a backplane circuit board therefor of the present invention.

The above and other features, aspects, and advantages of the present invention will now be discussed in the following detailed description and appended claims, which are to be considered in conjunction with the accompanying drawings in which identical reference characters designate like elements throughout the views. Shown in FIG. 1 is a telecommunication assembly 10, which is preferably a Digital Signal Cross Connect (DSX) assembly primarily constructed of metal, which has a first plate 12, a second plate 14, and two side walls 16 coupled between the first plate 12 and the second plate 14. Extending in perpendicular fashion from each of the side walls 16 is a retention bracket 18, as shown in FIGS. 1 and 2, that has at least one attachment aperture 26 disposed therein for securing the telecommunication assembly 10 to a frame.

Figure 4:
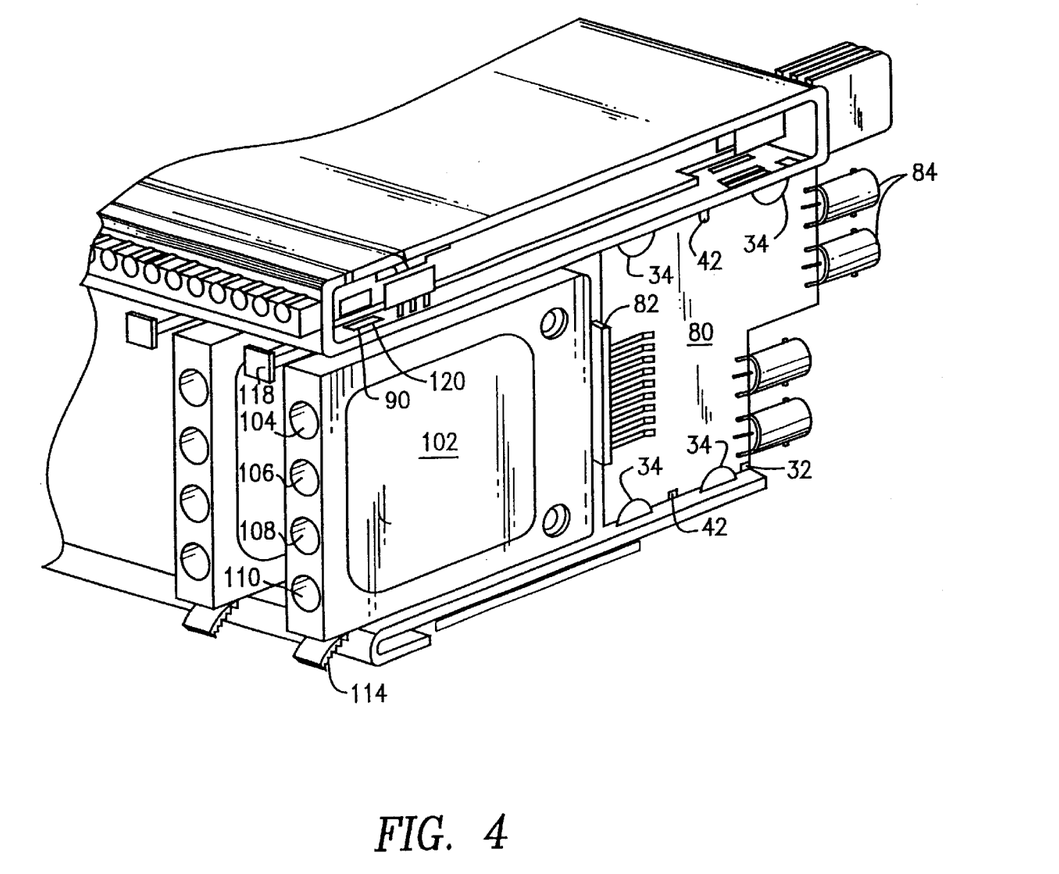
FIG. 4 is a perspective view of the module inserted into the backplane circuit board of the present invention.
Figure 5:
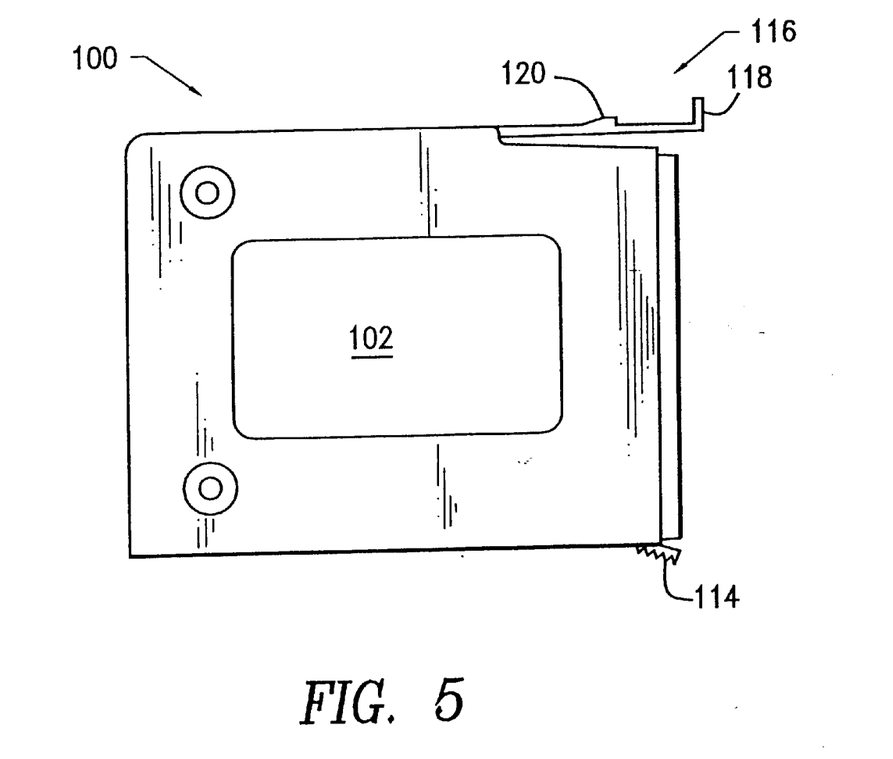
FIG. 5 is a side elevational view of the module of the present invention.

Shown in FIGS. 1, 4, and 5, is a telecommunication module 100, such as a Digital Signal Cross Connect (DSX) module, which is releasably secured within a panel for allowing communication between a piece of telecommunications equipment and a telecommunications network, such as a telephone network. Preferably, the present module 100 receives a DS-3 signal, which is at a frequency rate on the order of 44.736 megabits per second, but could be a lower frequency signal such as DS-1 on the order of 1.544 megabits per second or higher frequency signal such as a DS-4 on the order of 274.176 megabits per second. The module 100 includes a hard plastic casing 102, preferably constructed of a thermoplastic, to protect the contents of the module 100.

The module 100 has at least one jack such as a BNC for receiving a plug therein, but preferably has a plurality of WECO jacks including a first monitor jack 104, an output jack 106, an input jack 108, and a second monitor jack 110. The first monitor jack 104 and the second monitor jack 110 provide for the taking of samples of a signal from the telecommunications network and the output jack 106 and input jack 108 are for receiving the signal from, and inputting a signal to, the telecommunications network, respectively. When patching or monitoring is required to telecommunication network equipment, at least one DSX module 100 is slid into a slot 28 of the panel assembly where it aligns with an individual PCB, which is connected to the network equipment, resulting in the DSX module 100 intruding or intercepting a telecommunication signal running through the network equipment.

Figure 3:
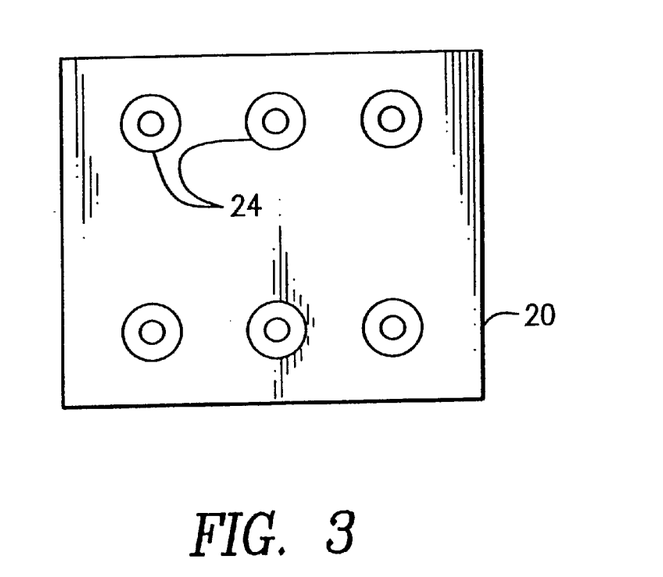
FIG. 3 is a side elevational view of a guide wall of the present invention.

As is best shown in FIGS. 1 and 4, a plurality of module guide walls 20 simultaneously direct the DSX module 100 upon insertion into the assembly and provide structural support for the assembly 10. The present DSX module 100 is fully enclosed in the plastic casing 102, which also provides the surface to guide the DSX module 100 into one of the slots 28 in the assembly 10. To aid in module insertion, one or more projections 24, such as those shown in FIG. 3, or one or more horizontal strips 22 are disposed on each of the guide walls 20, as shown in FIG. 1, for aiding in guiding each of the plurality of modules 100 into the slots 28 of the telecommunication assembly 10. Moreover, the projections 24 and strips 22 are preferably pressed or stamped into the guide walls 20 and extended outward from the guide walls 20 a distance equal to the width of the hinges for the doors, as will be discussed below, such that the modules 100 have no interference when slid into a slot 28. The guide walls 20 are preferably constructed of metal, such as stainless steel or tin.

Each of the modules 100 includes a grip 114 mounted therein for gripping by an operator, as shown in FIGS. 1, 4, and 5. Spaced apart from the grip 114 is a flange 118, which is also gripped by the operator, and an integrally formed tab 120. As shown in FIGS. 1 and 4, a retention aperture 112 is disposed in the assembly for receiving the tab 120 upon insertion of each of the plurality of modules 100 into one of the plurality of slots 28. To remove the module 100 from the telecommunication assembly 10, the grip 114 and flange 118 are squeezed toward one another thereby slidingly removing the tab 120 from the aperture disposed in the telecommunication assembly 10 as the module 100 is biased. The grip 114, flange 118, and tab 120 are constructed of hard plastic, which is also preferably a thermo-plastic similar to the casing 102 of the module 100. A spring arrangement is created on the module 100 because the flange 118 and integrally formed tab 120 extend outward from the casing 102 of the module 100.

Figure 12:
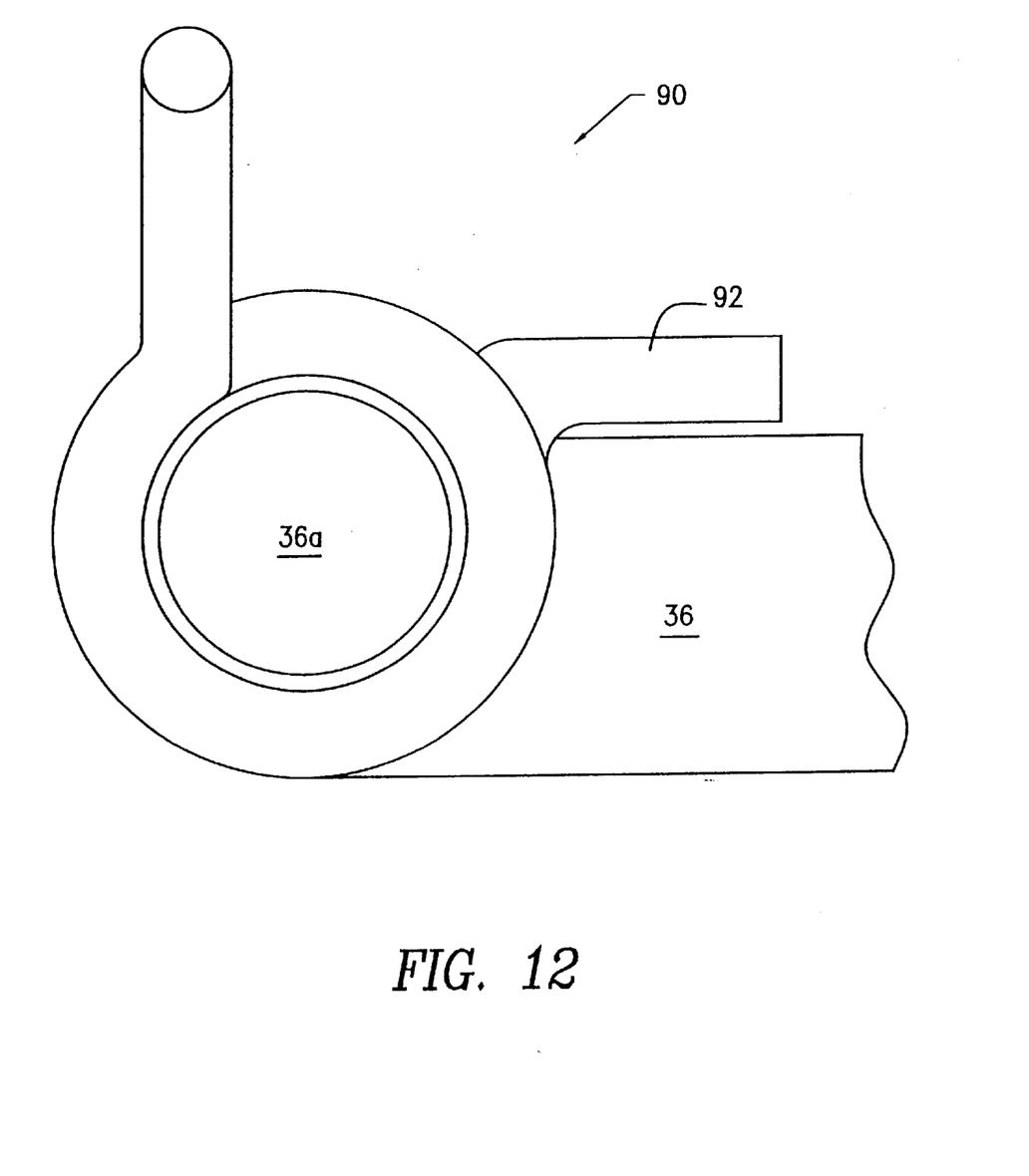
FIG. 12 is a plan view of a spring hinge for a slot door of the present invention.

Each slot 28 in the assembly 10 has a self closing swing door 36, as shown in FIG. 1, which covers the front of the slot when a DSX module 100 is not installed in a particular slot, thereby preventing environmental elements such as dirt from entering therein. The doors 36 have spring hinges 90, as shown in FIG. 12, for returning the doors 36 back to their normally closed positions. When a DSX module 100 is inserted into a slot 28, the associated door 36 is held open by abutting the module 100 thereby allowing an operator to visually see that a module 100 is inserted into a particular slot 28. One side of each door 36 has an integrally formed rod 36a, which tapers at the top and bottom. Each of such tapered portions is inserted through one of the spring hinges 90. An extension 92 protrudes from the top and bottom of each spring hinge 90. The top extension is coupled to the assembly, while the bottom extension is biased against the swiveable door 36. A spring force tension is created between the spring hinge 90 and the doors 36 upon insertion of a module 100 therein. This tension is relieved when the module 100 is removed from the slot 28.

Figure 6:
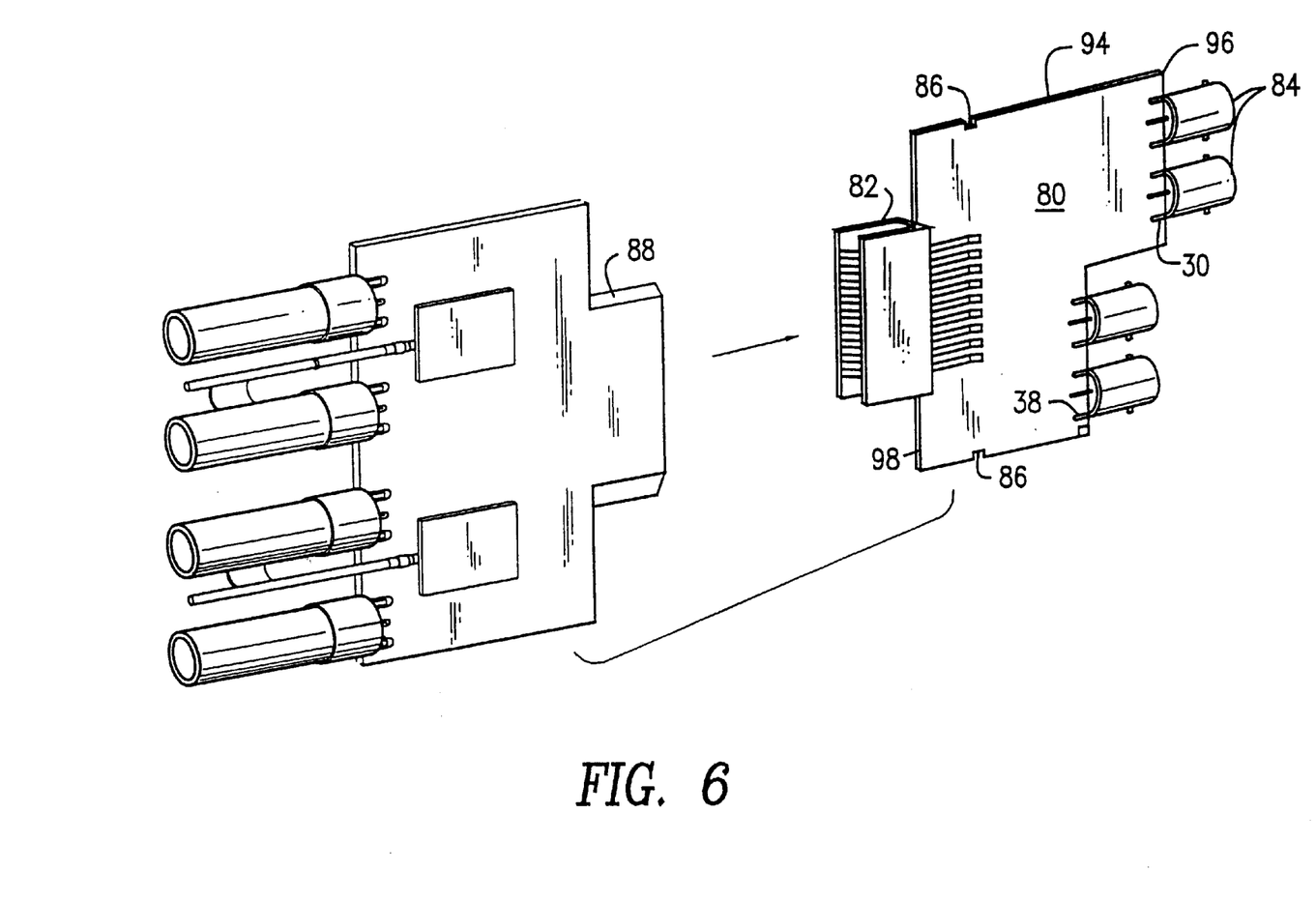
FIG. 6 is a perspective view of a card edge being inserted into a card edge connector of the backplane circuit board of the present invention.

The telecommunication assembly 10 couples to a telecommunication network and includes a plurality of distinct backplane circuit boards 80 secured therein for each coupling to one of the plurality of modules 100. As is best seen in FIG. 6, each of the plurality of distinct backplane circuit boards 80 include a bounding edge 94 and a back side 96 partially encompassed by the bounding edge 94. A plurality of first connectors, which are preferably BNC jacks 84 but could be any telecommunication adapter designed to attach to a circuit board such as a card edge connector 82, WECO jack, or wire-wrap, are coupled to the back side 96 of the circuit board for receiving a telecommunication signal from the telecommunication network. The BNC jacks 84 are preferably manufactured by the Amphenol Company, having a URL at http://www.Amphenol.com.

A front side 98 is integrally formed with the back side 96, and a second connector is mounted on the front side 98 and spaced apart from the at least one jack 84 for coupling to one of the plurality of modules 100. The second connector, which is preferably a normally closed, card edge connector 82 but could also be a plurality of BNC jacks 84, WECO jacks, or wire-wraps, is mounted on the PCB, as shown in FIGS. 4, 6, 8, and 9. The card edge connector 82 receives a card edge 88 therein having electrical contacts on only one side of the edge. During normal operation the telecommunication signal loops through the normally closed, card edge connector 82 with negligible loss such that it can be monitored from either the first monitor jack 104 or the second monitor jack 110.

Figure 8:
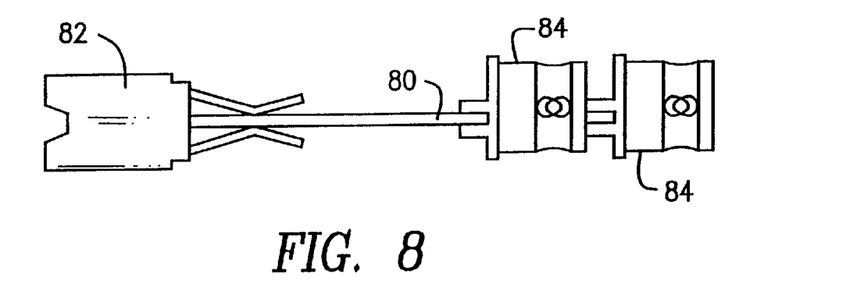
FIG. 8 is a side elevational view of the backplane circuit board of the present invention.
Figure 9:
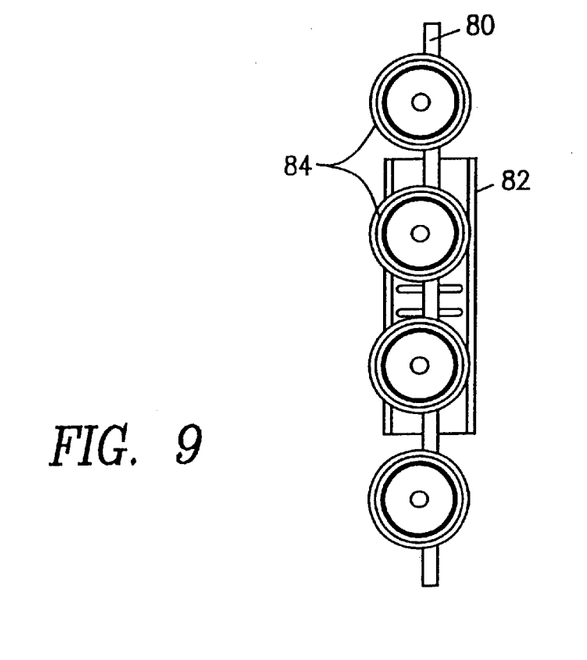
FIG. 9 is a rear elevational view of the backplane circuit board of the present invention.

A significant feature of the present invention is that the telecommunication assembly 10 is operable with one or more of the plurality of distinct backplane circuit boards 80 removed from the assembly 10. What's more, the back side 96 of each of the plurality of distinct backplane circuit boards 80 of the present invention is stepped, staggering at least one of the plurality of first connectors for easy access by an operator. This is best shown in FIGS. 6 and 8.

Figure 10:
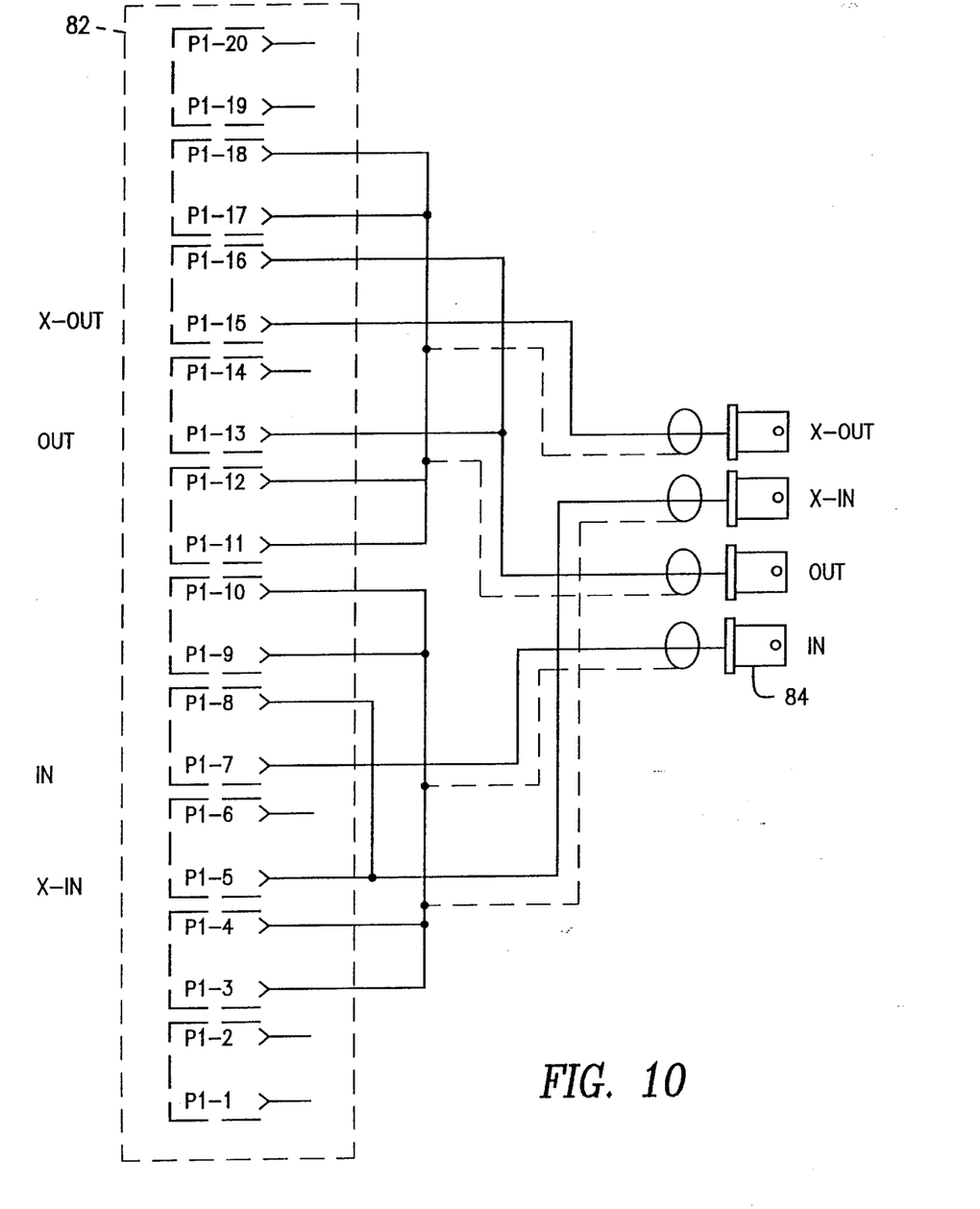
FIG. 10 is a circuit schematic of the backplane circuit board of the present invention.

The plurality of BNC jacks 84 coupled to the back side 96 of the distinct backplane circuit boards 80 are mounted to the bounding edge 94 of the each of the plurality of distinct backplane circuit boards 80. This mounting is preferably accomplished by two legs 30 extending from each BNC jack 84 and "pinching" the PCB by friction fit or being soldered to grounding pads on the backplane circuit board. A center conductor 38 press fits against a landing pad on one side of the circuit board. Shown in FIG. 10 is the circuit diagram for the backplane circuit boards 80, coupling the card edge connector 82 to the BNC jacks 84.

As is best seen in FIGS. 1 and 4, each of the plurality of distinct backplane circuit boards 80 are secured in parallel with one of the plurality of modules 100 when inserted into one of the slots 28. This allows for a maximum number of distinct backplane circuit boards 80 and associated modules 100 to be installed in a fixed space in the assembly. In addition, the edge mounted BNC jacks 84, instead of being board mounted, allow for the backplane circuit boards 80 to be no thicker than the diameter of the BNC jacks 84 further allowing for a maximum number of distinct backplane circuit boards 80 and associated modules 100 to be installed in a fixed space in the assembly 10.

At least one notch 86 is formed in the bounding edge 94 of each of the plurality of distinct backplane circuit boards 80, as shown in FIGS. 1, 4, and 6. A plurality of tines 42, as shown in FIGS. 1, 4, 7, and 11, are coupled to the telecommunication assembly 10 with at least one of the plurality of tines 42 partially extending into the at least one notch 86 at such an angle that the tine 42 asserts little resistance as the backplane circuit board 80 is inserted into the assembly 10 and great resistance when the backplane circuit board 80 is removed from the assembly 10. In operation of the present invention, a screwdriver or extended implement is used to force the tine 42 from the notch 86 when the backplane circuit board 80 is removed from the assembly 10.

Figure 7:
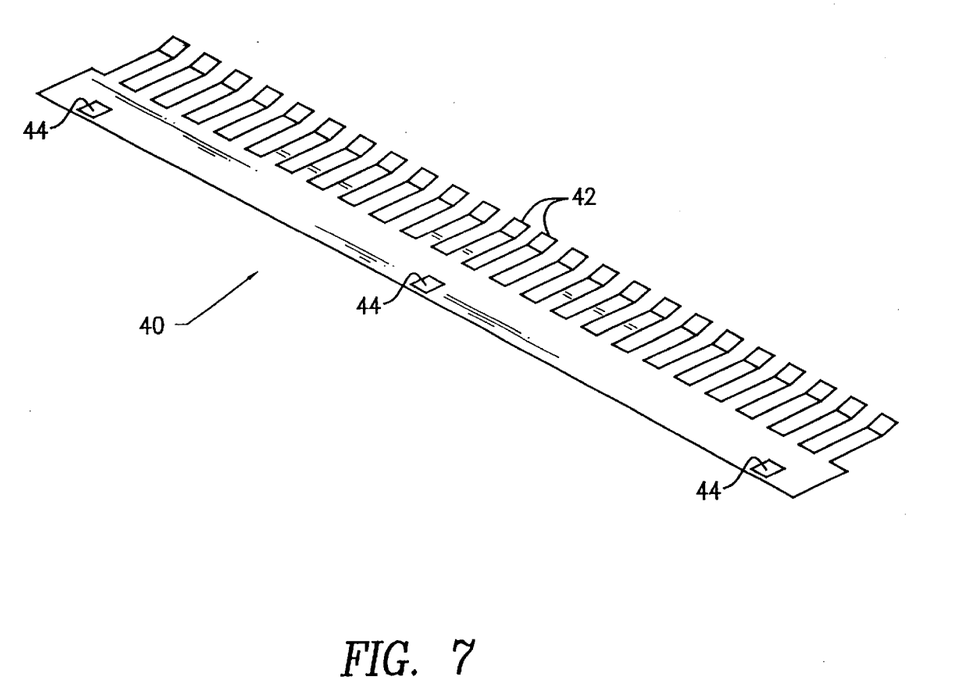
FIG. 7 is a perspective view of a leaf spring member of the present invention.

As shown in FIG. 7, a leaf spring member 40 of the present invention has a plurality of apertures 44 for attaching the leaf spring member 40 to the assembly 10. The plurality of tines 42 are integrally formed on the leaf spring member 40. In the preferred embodiment, one leaf spring member 40 is attached to the lower half of the assembly 10 and another to the upper half of the assembly 10 such that a tine 42 extends into an upper and lower notch 86 in each of the backplane circuit boards 80.

Figure 11:
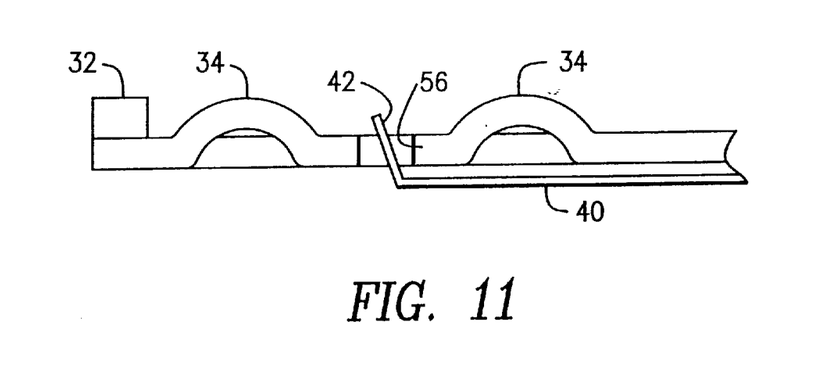
FIG. 11 is a side elevational view of two guide ridges of the present invention.

A pair of guide ridges 34 are attached to the telecommunication assembly 10 for guiding the plurality of distinct backplane circuit boards 80 when installed in, and removed from, the telecommunication assembly 10. The guide ridges 34 are preferably half-circle in shape, constructed of plastic or hard metal, and preferably there are two sets of guide ridges 34 for each backplane circuit board 80 with each set disposed on either side of the circuit board 80. As is best shown in FIG. 11, a plurality of metal or hard plastic stops 32 are disposed on the telecommunication assembly 10 against which the bounding edge 94 of each of the plurality of distinct backplane circuit boards 80 abuts. The plurality of stops 32 work most effectively when each of the distinct backplane circuit boards 80 are inserted into the front of the assembly, slid between the guide ridges 34, and subsequently abut the given stop 32. The guide ridges 34 and stop 32 are also preferably integrally formed with the assembly 10.

As mentioned above, the distinct PCBs 80 are slidably received in parallel to each other in the telecommunication assembly 10 and centered to be in a parallel plane with an associated DSX module 100. Preferably, a plurality of BNC jacks 84 are mounted on each PCB 80 and protrude outward in stair-step fashion thereby allowing easy coupling to the network equipment. The PCBs 80 are individually removable. This is desirable to the operator because they do not need to fully load the telecommunication assembly 10 with PCBs until telecommunication network growth requires such.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A telecommunication assembly having a plurality of slots for receiving a plurality of modules therein, the telecommunication assembly for coupling to a telecommunication network and comprising:
   a plurality of distinct backplane circuit boards secured therein for each coupling to one of the plurality of modules, each of the plurality of distinct backplane circuit boards including:
      a bounding edge,
      back side partially encompassed by the bounding edge;
      a plurality of first connectors coupled to the back side for receiving a telecommunication signal from the telecommunication network,
      a front side, and
      a second connector mounted on the front side and spaced apart from at least one jack for coupling to one of the plurality of modules, the second connector being normally closed; and
   wherein the telecommunication assembly is operable with the plurality of distinct backplane circuit boards removed from the assembly.

2. The telecommunication assembly of claim 1 wherein the plurality of distinct backplane circuit boards are releasably secured with the telecommunication assembly.

3. The telecommunication assembly of claim 1 wherein the second connector mounted on each of the plurality of distinct backplane circuit boards is normally closed-circuited.

4. The telecommunication assembly of claim 1 wherein the back side of each of the plurality of distinct backplane circuit boards is stepped, staggering at least one of the plurality of first connectors for access.

5. The telecommunication assembly of claim 1 wherein the plurality of first connectors coupled to the back side are mounted to the bounding edge of the each of the plurality of distinct backplane circuit boards.

6. The telecommunication assembly of claim 1 further comprising a pair of guide ridges are attached to the telecommunication assembly for guiding the plurality of distinct backplane circuit boards when installed in, and removed from, the telecommunication assembly.

7. The telecommunication assembly of claim 1 further comprising at least one notch formed in the bounding edge of each of the plurality of distinct backplane circuit boards.

8. The telecommunication assembly of claim 1 further comprising a plurality of stops disposed on the telecommunication assembly against which the bounding edge of each of the plurality of distinct backplane circuit boards abuts.

9. The telecommunication assembly of claim 1 further comprising a plurality of guide walls disposed therein for defining the plurality of slots, serving to guide each of the plurality of modules into the telecommunication assembly, and providing structural support to the telecommunication assembly.

10. The telecommunication assembly of claim 1 wherein each of the plurality of modules includes a flange mounted thereon for gripping.

11. The telecommunication assembly of claim 7 further comprising a plurality of tines coupled to the telecommunication assembly with at least one of the plurality of tines partially extending into the at least one notch.

12. The telecommunication assembly of claim 9 further comprising at least one strip disposed on each of the guide walls for aiding in guiding each of the plurality of modules into the telecommunication assembly.

13. The telecommunication assembly of claim 9 further comprising at least one projection disposed on each of the guide walls for aiding in guiding each of the plurality of modules into the telecommunication assembly.

14. The telecommunication assembly of claim 10 further comprising an aperture disposed therein.

15. The telecommunication assembly of claim 14 wherein each of the plurality of modules includes a tab mounted thereon for being received within the aperture upon insertion of each of the plurality of modules into one of the plurality of slots.

16. A telecommunication assembly having a plurality of slots for receiving a plurality of modules therein, the telecommunication assembly for coupling to a telecommunication network and comprising:
    a plurality of distinct backplane circuit boards secured therein for each coupling to one of the plurality of modules, each of the plurality of distinct backplane circuit boards including:
        a bounding edge,
        a back side partially encompassed by the bounding edge,
        a plurality of jacks coupled to the back side for receiving a telecommunication signal from the telecommunication network,
        a front side coupled to the back side, and
        a connector mounted on the front side and spaced apart from the at least one jack for coupling to one of the plurality of modules;
    a pair of guide ridges are attached to the telecommunication assembly for guiding the plurality of distinct backplane circuit boards when installed in, and removed from, the telecommunication assembly;
    a plurality of stops disposed on the telecommunication assembly against which the bounding edge of each of the plurality of distinct backplane circuit boards abuts; and
    wherein the telecommunication assembly is operable with one or more of the plurality of distinct backplane circuit boards removed from the assembly.

17. The telecommunication assembly of claim 16 further comprising at least one notch formed in the bounding edge of each of the plurality of distinct backplane circuit boards.

18. The telecommunication assembly of claim 16 further comprising a plurality of guide walls disposed therein for defining the plurality of slots, serving to guide each of the plurality of modules into the telecommunication assembly, and providing structural support to the telecommunication assembly.

19. The telecommunication assembly of claim 17 further comprising a plurality of tines coupled to the telecommunication assembly with at least one of the plurality of tines partially extending into the at least one notch.

20. A telecommunication assembly having a plurality of slots for receiving a plurality of modules therein and a plurality of doors covering the plurality of slots, the telecommunication assembly for coupling to a telecommunication network and comprising:
    a plurality of distinct backplane circuit boards releasably secured within the telecommunication assembly for each coupling to one of the plurality of modules, each of the plurality of distinct backplane circuit boards including:
        a bounding edge,
        a back side partially encompassed by the bounding edge,
        a plurality of jacks coupled to the back side for receiving a telecommunication signal from the telecommunication network,
        a front side spaced apart from the back side, and
        a connector mounted on the front side and spaced apart from the at least one jack for coupling to one of the plurality of modules, the connector being normally closed-circuited wherein the telecommunication assembly is operable with the plurality of distinct backplane circuit boards removed from the assembly.

21. The telecommunication assembly of claim 20 wherein the back side of each of the plurality of distinct backplane circuit boards is stepped, staggering at least one of the plurality of jacks for access.

22. The telecommunication assembly of claim 21 wherein the plurality of jacks coupled to the back side are mounted to the bounding edge of the each of the plurality of distinct backplane circuit boards.

23. The telecommunication assembly of claim 21 wherein each of the plurality of distinct backplane circuit boards are secured in parallel with one of the plurality of modules when inserted into one of the slots.

24. The telecommunication assembly of claim 21 further comprising a spring hinge at least partially biased against each of the plurality of doors such that each of the plurality of doors automatically closes when one of the plurality of modules is removed.

25. The telecommunication assembly of claim 21 wherein each of the plurality of modules is partially visible upon full insertion into one of the plurality of slots.

* * * * *

UNITED STATES PATENT AND TRADEMARK OFFICE
CERTIFICATE OF CORRECTION

PATENT NO. : 6,587,354 B1
DATED : July 1, 2003
INVENTOR(S) : Kutsch et al.

It is certified that error appears in the above-identified patent and that said Letters Patent is hereby corrected as shown below:

Column 8,
Line 42, replace "22. The telecommunication assembly of claim 21 wherein" with
-- 22. The telecommunication assembly of claim 20 wherein --
Line 46, replace "23. The telecommunication assembly of claim 21 wherein" with
-- 23. The telecommunication assembly of claim 20 wherein --
Line 50, replace "24. The telecommunication assembly of claim 21 further" with
-- 24. The telecommunication assembly of claim 20 further --
Line 55, replace "25. The telecommunication assembly of claim 21 wherein" with
-- 25. The telecommunication assembly of claim 20 wherein --

Signed and Sealed this

Ninth Day of March, 2004

JON W. DUDAS
*Acting Director of the United States Patent and Trademark Office*